May 6, 1941.  A. MAIER  2,240,995
CHANGE SPEED GEAR
Filed April 22, 1936  2 Sheets-Sheet 2
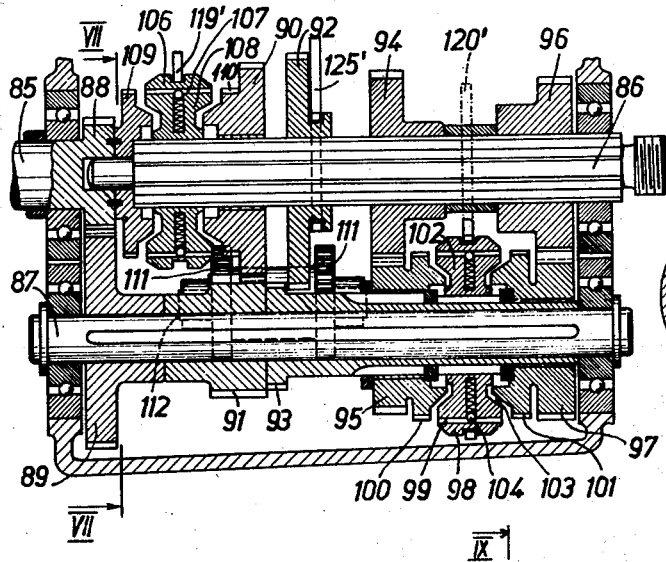
Fig.6
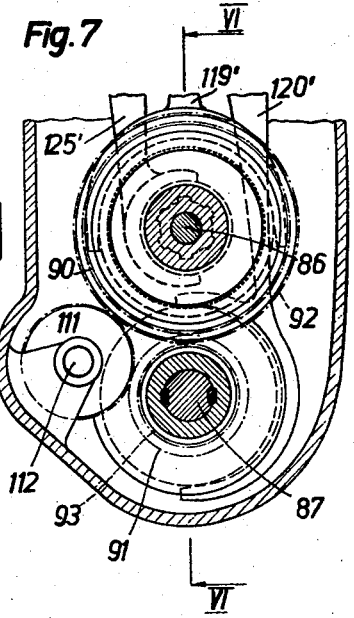
Fig.7
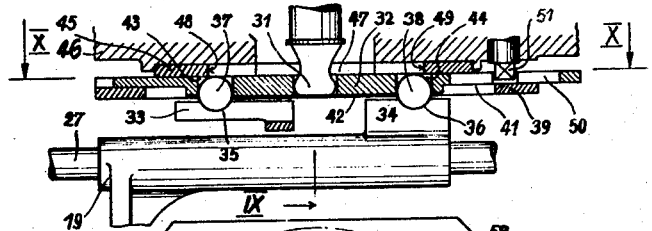
Fig.8.
Fig.9
Fig.10
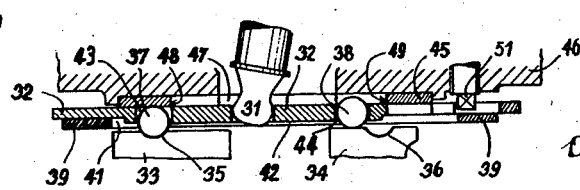
Fig.11.
Inventor:
Albert Maier
by S. Sokal.
Attorney.

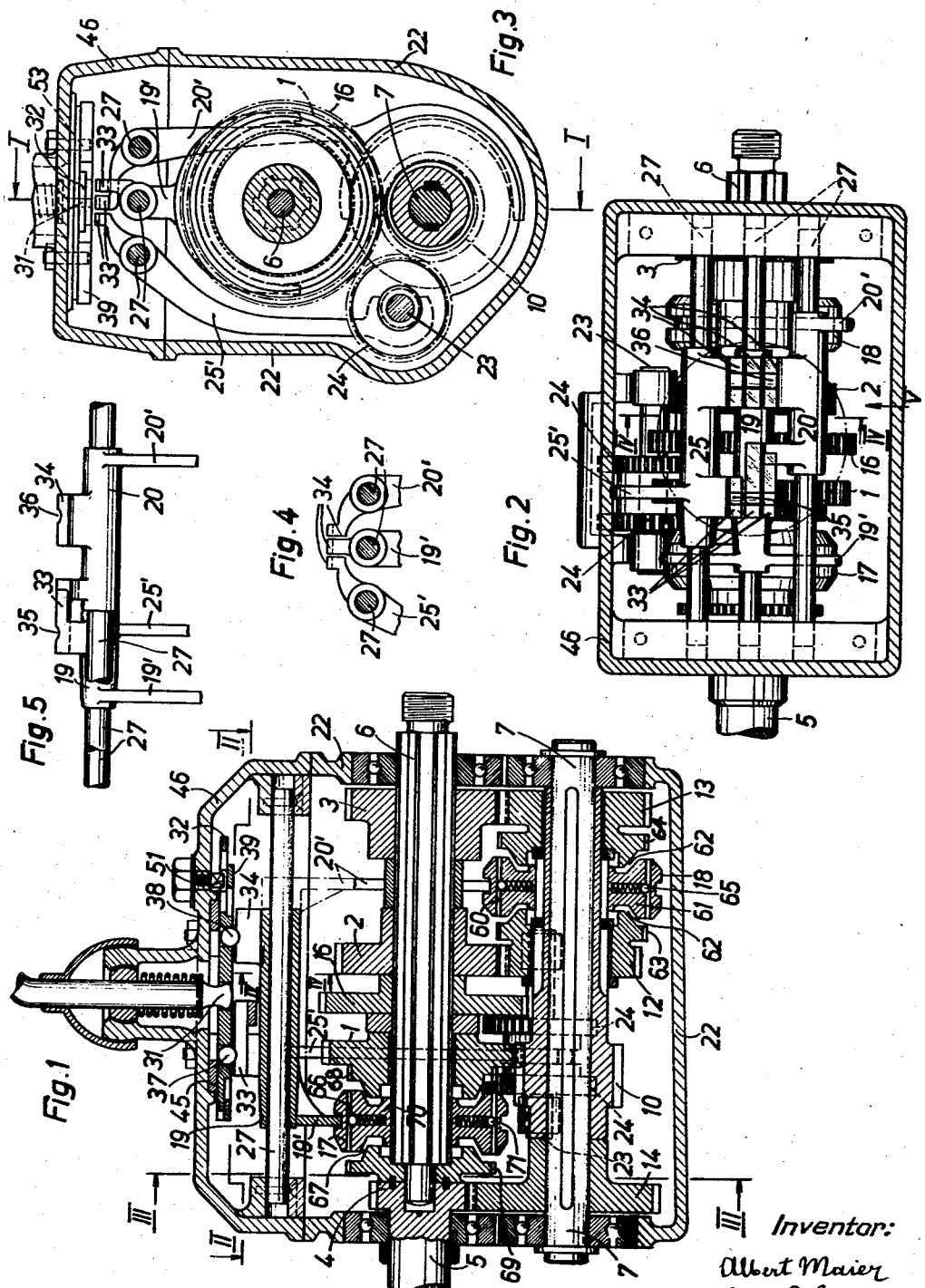

Patented May 6, 1941

2,240,995

UNITED STATES PATENT OFFICE 2,240,995

CHANGE SPEED GEAR

Albert Maier, Friedrichshafen-on-the-Bodensee, Germany, assignor to Zahnradfabrik Friedrichshafen Aktiengesellschaft, Friedrichshafen-on-the-Bodensee, Germany Application April 22, 1936, Serial No. 75,793
In Germany May 10, 1935

3 Claims. (Cl. 74—359)

Application has been filed in Germany on May 10, 1935.

The present invention relates to improvements in change speed gears, giving four or more speeds more particularly for power driven vehicles, of the type wherein pairs of constantly meshing toothed wheels are used, these toothed wheels being mounted on the one hand upon coaxial driving and driven shafts, and on the other hand upon a secondary or countershaft the driving shaft being journalled in the gear casing only at the inlet point thereof to the casing and the driving shaft being journalled in said casing only at the exit point thereof, and one of the pairs of toothed wheels fixedly mounted upon the driving shaft and the countershaft, respectively, being constantly operative, the wheels of this pair being whereby the countershaft is constantly driven from the driving shaft.

Gears of this type are usually constructed for three or four forward speeds and the reverse speed.

The object of the invention is to provide a construction of a gear of this type which will occupy the minimum space and will be very suitable for use on motor cars as well as commercial vehicles. Another object of the invention is to reduce as far as possible the noise produced by gears of this type during the idle run condition, and make the gear as far as possible noiseless whilst running under load. A further object of the invention is to facilitate change from one speed to another and reduce as far as possible the time required for changing, particularly when employing synchronizing devices of a known kind.

Another object of the invention is to provide very simple operating means for shifting the clutches or other means by which change of speed is effected, and to reduce as far as possible the space required by the operating means.

Another object of the invention is to reduce as far as possible the number of gear parts running loosely in the idle run condition of the gear and when the various speeds are brought into action.

Another object of the invention is to reduce as far as possible the agitation of the lubricating oil occasioned by the loose running of the gear parts. As the agitation of the oil is considerably reduced, the changing from one speed to another is greatly facilitated.

Another object of the invention is to facilitate the changing by a very simplified construction of the operating device.

An important feature of the invention is the fact that a pair of wheels which gives the lowest speed is arranged directly adjacent to the pair of wheels which is constantly operative for driving the secondary or countershaft from the main shaft, the loose wheel of the first mentioned pair of wheels being mounted on the driven shaft, and all the other wheels mounted upon the driven shaft being fast upon the driven shaft.

Another feature is the fact that the pair of wheels corresponding to the second highest speed is arranged at the driven side of the gear and directly adjacent to the bearings in which the shafts are mounted at this side of the gear in the gear casing. The operating means of the gear is characterized by a combination of co-operating slides and locking members mounted therein by which during the movement of the main operating lever the operating rods or other members serving to effect the speed change, are automatically coupled with the slide or uncoupled therefrom at certain times, the arrangement being, for instance, such that when the operating lever is moved from the zero or middle position in one direction, an operating rod or other member which has to be moved, is automatically coupled to the slide whilst another operating rod or like member is automatically uncoupled from the slide.

The accompanying drawings show by way of example a construction of the improved gear embodying the features of the invention.

Fig. 1 shows in longitudinal section on line I—I of Fig. 3 a change speed gear constructed for four forward speeds and a reverse speed.

Fig. 2 is a horizontal section on line II—II of Fig. 1.

Fig. 3 is a cross section on line III—III of Fig. 1.

Fig. 4 is a section on line IV—IV of Figs. 1 and 2.

Fig. 5 is an elevation seen in direction of arrow V, Fig. 2.

Figs. 6 and 7 are showing in a longitudinal section a five speed change speed gear on line VI—VI of Fig. 7 and in a vertical section on line VII—VII of Fig. 6.

Figs. 8, 9, 10 and 11 show the operating means for shifting the clutches or other means by which change of speed is effected.

Fig. 8 is a section on line VIII—VIII of Fig. 10 showing the parts in the middle position.

Fig. 9 is a cross section on line IX—IX of Fig. 8.

Fig. 10 is a plan view showing the parts located under the section line X—X of Fig. 8, a part located above this line being indicated by dotted lines.

Fig. 11 is a section similar to that shown in Fig. 8, the parts being shown shifted leftwardly of the middle position.

Referring first to Fig. 1, 5 designates the driving shaft and 6 designates the driven shaft, the two shafts being coaxial. 7 indicates a secondary or countershaft. Upon the driving shaft 5 is fast toothed wheel 4 which constantly meshes with a toothed wheel 14 fast upon the countershaft 7, the wheels 4 and 14 producing a constant drive of shaft 7 by shaft 5. The driven shaft 6 carries various other wheels arranged in a certain manner, namely, directly adjacent to the wheel 4 a loose wheel 1 which gives the first speed and the wheels 2 and 3 of the second and third speeds, the wheels 2 and 3 being fast upon the driven shaft. In mesh with wheel 1 is a wheel 10 fast upon countershaft 7, whilst the wheels 12 and 13 meshing with wheels 2 and 3 are freely rotatably mounted upon the hub of wheel 10 extending to the rear end wall of the casing 22. These wheels are provided with clutch claws or coupling teeth so that they can be coupled individually with the hub of wheel 10 by shifting an intermediate coupling sleeve 18 provided with clutch claws 60 either to the left or to the right. The coupling sleeve 18 is splined on the clutch part 61 which is loosely keyed upon the hub of the wheel 10. Provided on the clutch part 61 as well as on the oppositely positioned wheels 12 and 13 are friction surfaces 62 which serve in the usual manner for synchronising before the final engagement of the coupling sleeve 18 with clutch teeth 63 and 64 of the wheels 12 and 13. 65 are locking means for holding the coupling sleeve 18 upon clutch part 61 in normal inoperative position. Between the driving shaft 5 and the wheel 1 is provided a coupling sleeve 17 having clutch claws 66 and being longitudinally slidably mounted upon clutch part 70 which is splined upon shaft 6. The clutch claws 66 are adapted to engage in one position corresponding clutch claws 69 of the wheel 4 and in the other position of the coupling sleeve 17 corresponding clutch claws 68 of the wheel 1. For the reverse drive, a double toothed wheel 24, 24 is slidably mounted upon reverse drive shaft 23, said wheel being adapted to be displaced longitudinally. The one toothed part 24 meshes constantly with the wheel 10 of the countershaft 7 whilst the other toothed part 24 can be brought in mesh with the wheel 16 of the shaft 6. In the casing cover 46 are longitudinally slidable on stationary rods 27 the operating rods 19, 20 and 25 provided with the operating forks 19', 20' and 25'. When the coupling sleeves 17 and 18 which are operated by the operating rods 19 and 20 respectively, are in their inoperative middle position, as shown in the drawings, the gear runs idly, there being no power transmission from the driving shaft to the driven shaft. In this position the pair of wheels 4 and 14 and the wheels 1 and 10 of the first speed, as well as the countershaft 7 with the hub of wheel 10, run loosely, whilst all the other pairs of wheels stand still. It will thus be seen that in this position only one pair of wheels runs loosely apart from the constantly running pair of wheels 4, 14.

The pair of wheels of the third speed, namely 3, 13, is located directly adjacent to the bearings on the right, that is, the driven side of the gear, whereby bending of the shafts is avoided and consequently a very smooth run is attained.

Figs. 6 and 7 show the application of the invention to a five-speed gear in which the wheels are arranged in a similar manner as in connection with the four-speed gear illustrated in Figs. 1–5. The pair of wheels for the second speed is in this case arranged directly adjacent to the pair of wheels for the constant drive from the driving to the countershaft, and the pair of wheels of the fourth speed is arranged at the driven end near the bearing mounted in the wall of the casing. Such an arrangement is illustrated in Figs. 6 and 7, in which the wheel 88 fast on the driving shaft 85 and the wheel 89 fast on the countershaft 87 provide the constant transmission. On the driven shaft 86 is loosely mounted directly adjacent the wheel 88 the wheel 90 which provides the second speed and is in engagement with the pinion 91 on the countershaft 87. For the first speed, the wheels 92 and 93 are provided, the former being displaceably splined on the shaft 86 as it is employed for the reverse drive as well as for the first speed. For the third and fourth speeds, the wheel pairs 94, 95 and 96, 97 are provided, the wheels 95 and 97 being loosely mounted on the hub of the wheel 93, keyed to countershaft 87. The wheels 95 and 97 are adapted to be coupled with the said hub of the wheel 93 as desired, by means of the coupling sleeve 98 having clutch claws 99 adapted to engage with corresponding clutch teeth 100, 101 on the wheels 95 and 97 respectively. The coupling sleeve 98 is splined on the clutch part 102 which is loosely keyed upon the hub of the wheel 93. Provided on the clutch part 102 as well as on the oppositely positioned wheels 95 and 97 are friction surfaces 103 which serve in the usual manner for synchronising before the final engagement of the coupling sleeve 98 with clutch teeth 100 and 101 of the wheels 95 and 97. 104 are locking means for holding the coupling sleeve 98 upon clutch part 102 in normal inoperative position. Between the wheels 88 and 90 there is provided a coupling sleeve 106 having clutch claws 107 and being longitudinally slidably mounted upon clutch part 108 which is splined upon shaft 86. The clutch claws 107 of the coupling sleeve 106 can be brought in engagement with clutch claws 109 of wheel 88 or with clutch claws 110 of wheel 90. For reverse drive a double toothed wheel 111, 111 is provided upon the reverse shaft 112. With the one wheel 111 meshes constantly the wheel 91 and with the other wheel 111 the slidable wheel 92 is engageable. For shifting the coupling sleeves 106 and 98 and the wheel 92 there are provided the operating forks 119', 120' and 125' respectively, which operating forks may be connected to operating rods similar to the operating rods 19, 20 and 25 of the gear construction of Figs. 1 to 5.

The device for operating the change speed gear as shown in Figs. 2, 3, 4, 5 and 8, 9, 10, 11 is constructed as follows:

The main gear changing lever is provided with an operating finger 31 engaging a slot formed in the slide 32. On each of the three operating rods 19, 20 and 25 are provided two upwardly directed projections 33 and 34 as clearly shown in Figs. 2, 3, 4 and 5. These projections are disposed close to the slide 32 and are formed with recesses 35, 36 respectively for receiving coupling or locking members 37 and 38 respectively. The locking members are preferably constituted by small rollers. The projections 33 and 34 of all the operating rods 19, 20 and 25 are arranged fairly close together so that in the idle run condition of the gear the recesses 35 and 36 each lie in a row transversely to the operating rod. This enables the locking rollers 37, 38, which are mounted in the slide 32 to be moved transversely and to be brought into the longitudinal plane of one or other of the operating rods 19, 20, 25. The projections 33 or 34, of the operating rods 19 and 20 corresponding to the forward speeds are arranged in staggered relation, that is, the projection 33 of the operating rod 19 lies in front of the projection 34 of the operating rod 20 and the projection 33 of the operating rod 20 lies in front of the projection 34 of the operating rod 19. The operating rod 25, which controls the reverse speed, has its two projections 33 and 34 in the same vertical plane. The slide 32 is slidably guided by means of a groove 40 in a plate 39. The plate 39 also possesses an opening 41 into which a projection 42 formed upon the underside of the slide 32 projects. There are also provided recesses 43, 44 in the slide 32 which serve for the reception of the locking members 37 and 38. Above the slide 32 is located a stationary locking plate 45 mounted in a cover 46 of the gear casing. This locking plate 45 has a cutout or opening 47 of suitable shape, the edges 48 and 49 of which are adapted to act upon the locking members 37 and 38 of the slide 32.

The slide 32 is preferably formed at one end as a control gate 50 with which engages a guide pin 51 fixed to the gear cover 46. Moreover, the plate 39 has guide slots 52 extending transversely to the longitudinal direction of movement of the slide 32. These guide slots are engaged by stationary members 53. The plate 39 can, therefore, be moved transversely by means of the operating finger 31 as required for effecting operation of the various operating rods or their projections 33, 34 lying side by side.

The operation is as follows:

The operating finger 31 is in constant engagement with the plate 39 and the slide 32 so that plate 39 and slide 32 can be moved first transversely above the operating rods. This transverse movement is effected for selecting the speed and by this movement the locking members 37, 38 are moved into the projection 33 or 34 or the recesses 35 or 36 of these operating rods. If it now be assumed that the parts, which are shown in Fig. 8 in the middle position of the operating finger 31, engage with their locking members 37, 38 the recesses 35, 36 of two projections 33, 34 lying one behind the other, of the operating rods, then upon movement of the control finger 31 and the simultaneous movement of the slide 32 in the forward direction, that is leftwards, the locking member 37 will enter below plate 45 (Fig. 11) and consequently the slide 32 will carry the projection 33 and an operating rod whilst, during the same movement the locking member 38 lying behind will be released, so that it will move from the projection 34 or out of its recess 36, the operating rod to which this projection 34 belongs being stopped. The locking member 38 is, in this case, in the position as shown at the right hand side of Fig. 11. During reverse movement, that is, during movement towards the right, the other operating rod will be operated and the first mentioned operating rod will be stopped or moved into the rest position.

To sum up, the following operations are carried out in respect of each gear change.

To engage the first speed: The finger 31 is brought into alignment with the projection 33 of the operating rod 19 and then the slide 32 is shifted rearwardly so that the coupling sleeve 17 engages the clutch claws 68 of the wheel 1. Then the power transmission takes place from shaft 5 via wheels 4, 14, countershaft 7, wheels 10, 1 to the driven shaft 6.

To engage the second speed: The finger 31 is brought into alignment with the projection 33 of the operating rod 20 and then the slide 32 is shifted forwardly so that the coupling sleeve 18 engages the clutch claws 63 of the wheel 12. Then the power transmission takes place from shaft 5 via wheels 4, 14, countershaft 7 and via wheels 12, 2 to driven shaft 6.

To engage the third speed: The finger 31 is brought into alignment with the projection 34 of the operating rod 20 and then the slide 32 is shifted rearwardly so that the coupling sleeve 18 engages the clutch claws 64 of the wheel 13. Then the power transmission takes place from shaft 5 via wheels 4, 14, countershaft 7, via wheels 13, 3 to driven shaft 6.

To engage the fourth speed (direct drive): The finger 31 is brought into line with the projection 33 of the operation rod 19 and then the slide 32 is shifted forwardly so that the coupling sleeve 17 engages the clutch claws 69 of the wheel 4. Then the power transmission takes place directly from the driving shaft 5 to the driven shaft 6.

To engage reverse drive: The finger 31 is brought into line with the projections 33 and 34 of the operation rod 25 and then the slide 32 is shifted to the rear so that one part of the double toothed wheel 24 meshes with wheel 16. Then the power transmission takes place from shaft 5 via wheels 4, 14, countershaft 7, wheels 10, 24 and via wheels 24, 16 to the driven shaft 6 which latter rotates now in the reverse direction.

The operation of the gear shown in Figs. 6 and 7 (for five forward speeds and reverse speed) is similar to the above operation for a four speed change speed gear, the following sets of wheels being in this case employed for the respective speeds:

For 1st speed: wheels 4, 14 and wheels 93, 92,
For 2nd speed: wheels 4, 14 and wheels 91, 90,
For 3rd speed: wheels 4, 14 and wheels 95, 94,
For 4th speed: wheels 4, 14 and wheels 97, 96,
For 5th speed: the coupling sleeve 106 of driven shaft 86 and clutch claws 109 of driving shaft 85,
For reverse speed: wheels 4, 14, 91, 111, 111, 92.

I claim:

1. In a change speed gear for power driven vehicles, the sub-combination of: a casing; a driving shaft; a driven shaft coaxial with said driving shaft; a countershaft parallel to said driving and driven shafts; bearings at one end of the casing for said driving shaft and said countershaft; bearings at the other end of the casing for the driven shaft and for said countershaft; a toothed wheel fixedly mounted upon the driving shaft; a toothed wheel fixedly mounted upon the said countershaft, said two toothed wheels being permanently in engagement, whereby said countershaft is constantly driven by said driving shaft; a plurality of pairs of co-operating toothed wheels carried by said driven and countershafts for obtaining various ratios of transmission from the driving to the driven shaft; the pair of toothed wheels giving the highest ratio of transmission, that is, the lowest speed of the driven shaft, being mounted directly adjacent to said pair of toothed wheels fixedly mounted upon the driving shaft and the countershaft, and comprising a toothed wheel loosely mounted upon the driven shaft and adapted to be coupled thereto; all the remaining toothed wheels mounted upon the driven shaft being fixed thereto and their cooperating toothed wheels being loosely mounted on the countershaft; the pair of toothed wheels giving the second highest speed of the driven shaft being mounted directly adjacent to the bearings at the side of the casing at which the driven shaft emerges from the casing.

2. In a change speed gear for power driven vehicles of the kind referred to, control means for providing several gear drives comprising: shafts; clutch members slidably mounted upon said shafts; operating rods operatively connected with said clutch members and slidable parallel to said shafts; a main control lever adapted to move both longitudinally and transversely with regard to said operating rods; a first slide adapted to move transversely to said operating rods; a second slide adapted to move longitudinally with regard to and guided in said first slide; said second slide being operatively connected with said main control lever; locking members mounted in said second slide and in said operating rods for coupling said rods to said slide; and a locking plate located directly above said second slide for controlling said locking members.

3. In a change speed gear for power driven vehicles of the kind referred to, control means for providing several gear drives comprising: shafts; clutch members slidably mounted upon said shafts; operating rods operatively connected with said clutch members and slidable parallel to said shafts; a main control lever adapted to move both longitudinally and transversely with regard to said operating rods, a first slide adapted to move transversely to said operating rods; a second slide adapted to move longitudinally with regard to and guided in said first slide, said second slide being operatively connected with said main control lever, locking members mounted in said second slide and in said operating rods for coupling said rods to said slide; and a locking plate located directly above said second slide for controlling said locking members, said locking members being constituted by rollers and said second slide being formed with a gate.

ALBERT MAIER.